INVENTOR.
HERBERT E. TAUTZ
BY
Sang, Desmond & Parker

INVENTOR
HERBERT E. TAUTZ
BY
Toney, Desmond & Parker

INVENTOR.
HERBERT E. TAUTZ
BY
Gary, Desmond & Parker

Oct. 19, 1965 H. E. TAUTZ 3,212,354

MECHANICAL MEMORY DEVICE

Filed Dec. 11, 1961 9 Sheets-Sheet 4

INVENTOR.
HERBERT E. TAUTZ
BY
Gary, Desmond & Parker

Oct. 19, 1965 H. E. TAUTZ 3,212,354

MECHANICAL MEMORY DEVICE

Filed Dec. 11, 1961 9 Sheets-Sheet 5

INVENTOR.
HERBERT E. TAUTZ
BY
Gary, Desmond & Parker

INVENTOR
HERBERT E. TAUTZ
BY
Gary, Desmond & Parker

Oct. 19, 1965 H. E. TAUTZ 3,212,354

MECHANICAL MEMORY DEVICE

Filed Dec. 11, 1961 9 Sheets-Sheet 7

INVENTOR.
HERBERT E. TAUTZ
BY
Gary, Desmond & Parker

INVENTOR.
HERBERT E. TAUTZ
BY
Gary, Desmond & Parker

INVENTOR.
HERBERT E. TAUTZ
BY
Gary, Desmond & Parker

3,212,354
MECHANICAL MEMORY DEVICE

Herbert E. Tautz, Denver, Colo., assignor to Binks Manufacturing Company, Chicago, Ill., a corporation of Delaware Filed Dec. 11, 1961, Ser. No. 158,272
31 Claims. (Cl. 74—568)

The present invention relates to mechanical memory devices wherein data is recorded or read-in by simple mechanical movements and the thus "memorized" data is recalled at a predetermined phase relationship with respect to the moment of recording. The invention is particularly directed to improvements in structure, mode of operation and results of such devices.

Mechanical memory devices of the general character are comprised of a pair of relatively movable members, usually a stationary support and a rotatable member, a series of control elements shiftably mounted on the rotatable member for individually selective positioning in one or the other of two locations, a read-in device or input station on the stationary support for selectively positioning the control elements, and detector or read-out means, such as an electric control switch, carried by the stationary support at an angular spacing from the input station and adapted to be actuated by the presence of a control element in one only of its said locations. The control elements are usually pins shiftable axially of the members, such as shown in Patent No. 2,909,626 to Bruno E. Enssle, or balls shiftable radially of the members, such as shown in the copending application of Bruno E. Enssle, Serial No. 805,911, filed April 13, 1959, now patent 3,013,445; both said patents being assigned to the assignee of this application.

The object of the present invention generally stated is to provide improvements in both styles of timers.

A first and prime object of the invention is the provision of an improved timer or control device wherein the relatively rotatable members are comprised of a pair of concentric rings each of thin radial section and mutually journalled together to prevent relative movements other than rotation.

A great limitation imposed upon mechanical timers heretofore has been that of size, and thus of timing intervals and capacity. When attempts were made to increase size, twisting and warping of the materials of construction prevented accurate operation and the mass and expense of the unit were excessive. By being mutually journalled concentric rings of thin radial section, the weight and cost of the timer are maintained at a minimum, the tendencies toward warpage and critical dimensional variations are mitigated, and the two rings are maintained in cooperative relation for perfectly accurate operation inasmuch as the bearings cause each of the two rings to resist and/or exactly duplicate any warpage or twisting in the other ring. Thus, the ring timer of this invention can be fabricated in any size desired, for example of 6 inch diameter or 5 foot diameter, thereby to accommodate as few or as many control elements, and as short or as long a timing cycle as desired.

In addition, the concentric rings of my timer facilitate drive from the interior thereof, whereby the overall dimensional requirements of a timer of given capacity may be greatly reduced, both in outside diameter and thickness.

A second object of the invention is to journal the two concentric rings together by means of balls fitting into aligned annular grooves in surfaces of the rings that are opposed to one another in the direction radially of the rings, whereby the rings are journalled on one another and retained against relative movement other than rotation by the balls alone.

Another object of the invention is the provision in a timer as defined of constructional features accommodating, in contrast to the prior art, shifting of ball type control elements axially of the rings and shifting of pin type control elements radially of the rings, thereby to achieve greater functional capabilities for the timer and especially to accommodate installation of the same in any desired position, i.e., vertical, horizontal, or any position therebetween.

An additional object of the present invention is to provide in control devices of the character described improved drive means for normally rotating one ring but yieldable in response to predetermined resistance to rotation to discontinue rotation thereof. It is a particular object to incorporate this feature in both a step-by-step ratchet style of drive means and a rotary gear type of drive means.

A further object of the invention is the provision of improved means for deriving incremental driving force for the timer from a conveyor or the like in conjunction with which the timer is used without subjecting the timer to intermittent impact or shock.

Other particularly important objects of the invention are to provide an improved timer having capability for a plurality of input stations; improved input or read-in station means freely adjustable as to input location and timing; and improved read-out means or detectors freely adjustable as to location and timing.

Still further objects of the invention are the provision in timers of the character described of improved constructional details, improved manner of loading the bearings and control elements, improved means for and modes of mounting the timer, improved means for guiding the control elements to intended position, and improved means for mitigating jamming of the timer.

These and other objects and advantages of the invention will become apparent in the following detailed description of preferred embodiments of the invention.

Now, in order to acquaint those skilled in the art with the manner of making and using the mechanical memory devices of my invention, I shall describe, in connection with the accompanying drawings, three preferred embodiments of my invention and the preferred manners of making and using the same.

In the drawings, wherein like reference numerals indicate like parts:

Figure 1:
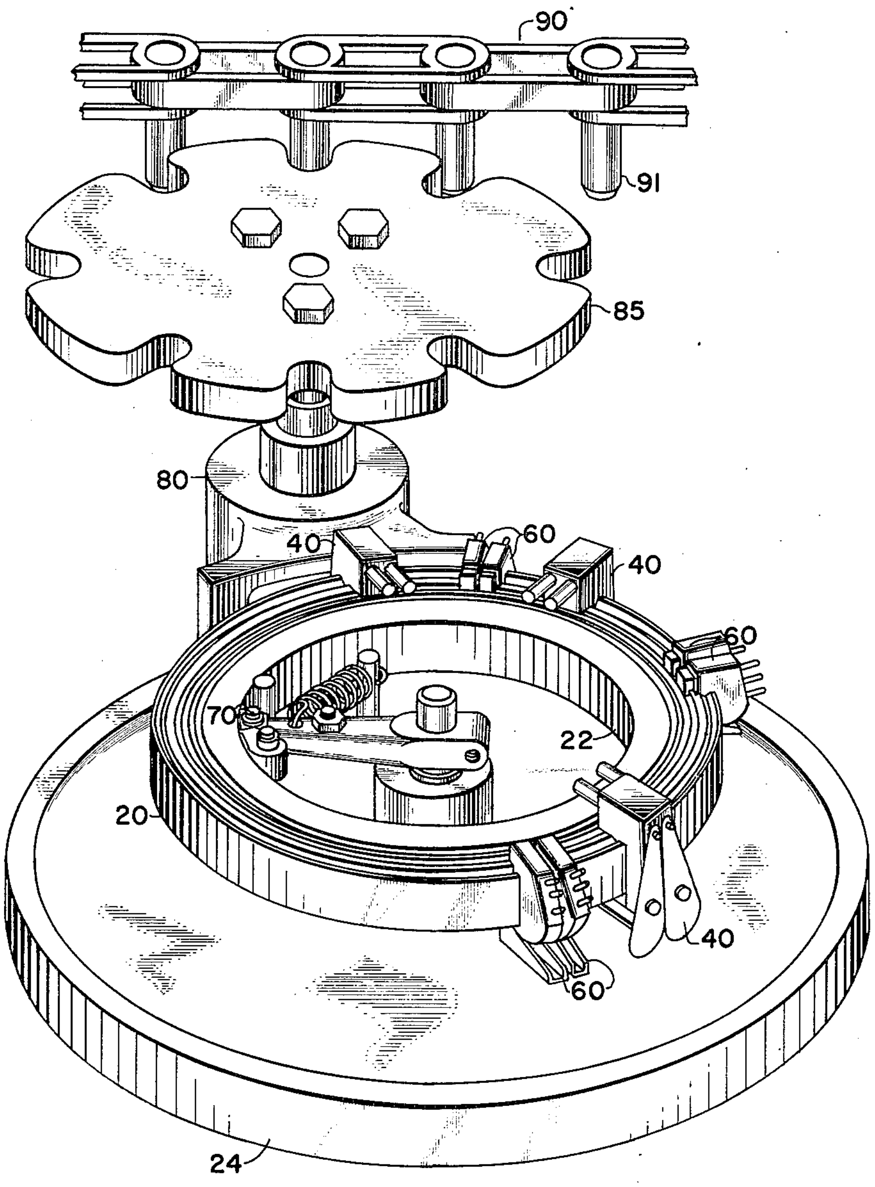
FIGURE 1 is a perspective view of a preferred embodiment of the timer of the invention and of a preferred drive therefor.

Referring now to the drawings, and particularly to FIGURES 1 to 6, I have shown a preferred embodiment of my invention as being comprised in its prime aspect of a pair of relatively rotatable, substantially coplanar, concentric rings 20 and 22. One of the rings carries a plurality of control elements 30 and the other carries one or more input or read-in stations 40 and one or more readout stations or detectors 60 for each station 40.

Inasmuch as the relatively rotatable rings 20 and 22 are the primary or basic components of my timers, the terms "axial" and "radial" as used in this specification and the appended claims have reference to the axis of relative rotation and to the radii of the two rings; "axial" meaning along or parallel to said axis and "radial" meaning at right angles to and intersecting said axis. The term "ring" is to be taken in the sense of a centrally hollow circular member, e.g., a circular band or annulus such as a finger ring; in other words, the space between two concentric circles one within the other.

While either of the rings 20 and 22 could be rotated, or both rings could be rotated in opposite directions, or in the same direction at differential speeds, several advantages are obtained by stationary mounting of the outer ring and rotation of the inner ring. Accordingly, I prefer to mount the outer ring in fixed position in spaced parallel relation to the base portion 24 of an enclosure or housing (the upper portion of which is not shown as it is conventional), and I provide the inner ring with drive means indicated generally at 70.

The control elements 30 and the reading stations 40 and 60 can be provided on either of respective rings, but it is preferred that the elements 30 be carried by the rotatable ring and the station means by the stationary ring.

Figure 5:
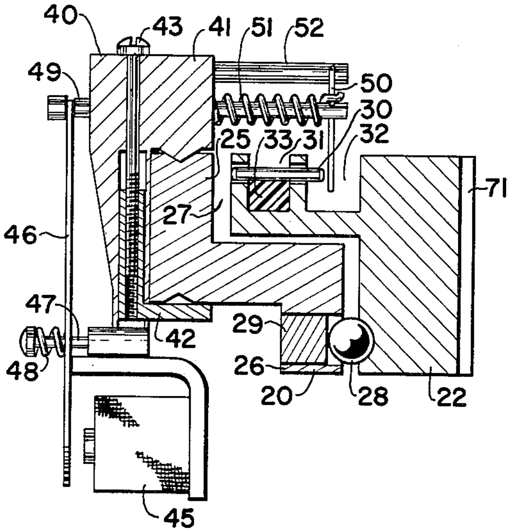
FIGURE 5 is a vertical sectional view of the rings and the input station.
Figure 6:
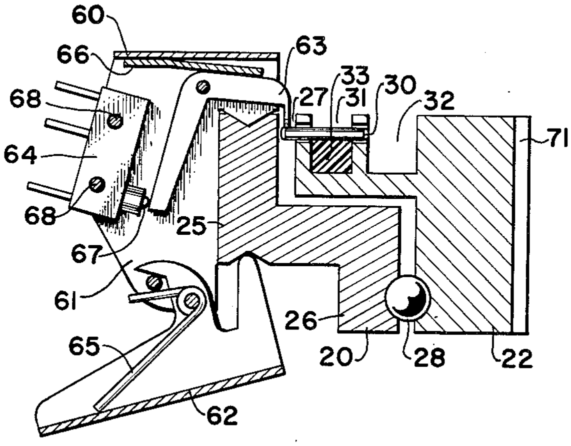
FIGURE 6 is a vertical section of the rings and a read-out device or detector.

The outer stationary ring 20, as shown particularly in FIGURES 5 and 6, is preferably of a stepped or S-shaped cross-section, whereby to maintain a thin radial section throughout while defining a read-in and read-out station mounting portion 25 of minimum dimensional requirements and a spaced bearing portion 26 located to achieve accurate alignment of the two rings. The outer peripheral surface of the inner rotatable ring 22 is complementary to the outer ring so that the inner ring fits within the outer with a slight radial clearance sufficient to define an axially open annular gap 27 between the two rings.

The bearing portion 26 of the outer ring and the juxtaposed portion of the inner ring are provided with opposed annular grooves of partially circular section, and a series of balls 28 are inserted within the aligned grooves to afford an anti-friction bearing journalling the ring 22 on the ring 20. The balls are preferably loaded into the aligned grooves through a radial hole in the outer ring, which hole is closed by a plug 29 when the annular recess defined by the two grooves is filled with balls. The balls 28 not only journal the inner ring on the outer ring, but interconnect the two rings in such manner that no relative movement of the rings, other than rotation, may occur. This structural feature, coupled with formation of both rings of thin radial section, accommodates fabrication of the timer in almost any size desired. The two rings, because of their substantial identity of size and dimension, will be subject to exceedingly little if any relative dimensional variation due to thermal expansion and contraction, and any tendency toward warpage or twisting in one ring will be resisted by and/or duplicated in the other ring due to the structural coupling of the two by the bearing balls. Thus, absolute accuracy of operation of the timer under all conditions and in all sizes is assured.

In the present embodiment of the invention, the timer or memory control elements comprise pins 30 which extend and are shiftable radially of the rings. The pins are preferably carried by the rotatable inner ring. To afford a mounting for the pins, the inner ring is provided in the axially facing surface thereof opposite the bearing means 28 with a pair of annular grooves 31 and 32 which are concentric with one another and the two rings, and which with the annular gap 27 define three closely spaced concentric recesses separated by a pair of axially extending annular ribs. As will become apparent as the description proceeds, three concentric annular recesses could be provided directly in the inner ring without reliance on the annular gap, if so desired. Also, the three "recesses" would not have to be defined below the surface of the inner ring so long as three concentric annular areas separated by a pair of ribs are defined. In any of these events, the two separating ribs are drilled in the radial direction at suitable preselected intervals about the periphery of the ring 22 to receive as many pins as may be accommodated or desired in a given ring size. For example, the unit shown includes 180 equally spaced pins 30. In the illustrated embodiment, the stepped construction of the outer ring and the outer surface of the inner ring afford the advantage that the pins may be disposed at the maximum desired diameter without imposing the same maximum diametrical requirement on the bearing means. Also, the bearing balls 28 are thus aligned with the control elements to exert alignment influence at an optimum location.

In devices of the character described, jamming or sticking of the control elements is a critical factor, and even lubrication of the elements is not desired since lubricants accumulate impurities and stiffen when cold. To avoid the problem, I make my device of such construction and structural materials that relatively movable parts have an exceedingly low coefficient of friction therebetween and will not require lubrication. The balls 28 serve this function between the two rings. As to the pins, I form the same from and/or mount the same in a ring formed of a material having a very low coefficient of friction, such as "Teflon" or "Delrin." I prefer to form the rings 20 and 22 of metal, suitably steel, and therefore prefer pins 31 formed of or coated with "Delrin." Consequently, each pin 31 has a freely slidable mounting in an aligned pair of the radially extending holes in the two annular ribs. Each pin is of a length greater than the radial dimension of the central one of the three recesses, i.e., the recess 31, so as to be mounted in both ribs, but is of a length less than the radial dimension of the three recesses so as to be slidable therein throughout a significant stroke of movement radially of the rings. To retain the pins in position to which directed, as hereinafter described, a pad 33 of friction material, such as foamed plastic, is inserted in the recess 31. The sole purpose of the central recess is reception of the friction pad 33 to hold the pins in position and thereby accommodate use of the ring in any desired position. If retaining means were dispensed with, or other pin retaining means were employed, the central recess could, of course, be eliminated.

The outboard ones of the three recesses, i.e., the annular gap 27 and the radially inner recess 32, constitute passages for gaining access to the pins 30 for purposes of locating the pins in a predetermined normal position herein an "inactive" position, shifting the pin selectively to a second or "active" position and sensing the presence or absence of a pin in one or othe other of its positions. The first two functions are performed according to the present embodiment of the invention by the input station means 40, and the third by the read-out station means or detectors 60. In performance of the first function, pin centering elements enter into both access recesses. As to the other functions, station means may enter into either or both of the recesses. For example, the input station means may enter into either recess, and the detector means may enter into the same or the other recess. In the preferred assembly, the input is effected via the inner recess 32 and detection is effected via the outer recess 27.

Figure 4:
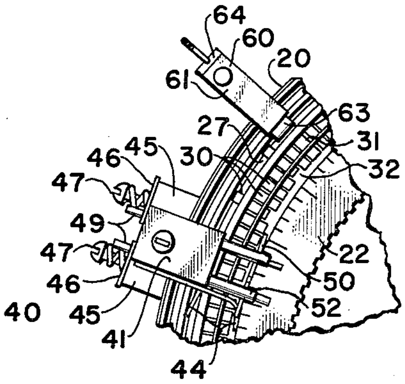
FIGURE 4 is a similar view of the rings, an input station and a detector.

The read-in or input station means 40 provided according to the invention is shown in its preferred embodiment in FIGURES 4 and 5. As illustrated, each station comprises a body 41 having a freely adjustable mounting on the ring 20 to accommodate disposition of the same at any desired location about the periphery of the ring. Specifically, the ring 20 is provided with an annular guide track in the form of V-shaped recesses in the upper and lower surfaces of the mounting portion 25 thereof. The body 41 is generally of inverted L-shape in cross-section and fits about the margin of the ring portion 25, the foot of the L having a V-shaped projection entering into the recess in the upper surface of the ring thereby to be guided on the track. The body is slotted in the central region thereof for reception of a block 42 operated by means of a vertically extending screw 43 and having a foot disposed to engage the lower surface of the ring portion 25 upon tightening of the screw to cause the body to become fixedly clamped to the ring. The complete adjustability of the input (and detector) stations is of particular advantage since its accommodates mass production of both inner and outer rings to a single standard and permits complete interchangeability of parts.

As above indicated, the first function of the input station is to align, center or locate the control elements 30 in a first predetermined position, which in the present embodiment of the invention comprises an "inactive" position. For performance of the stated function, a generally U-shaped bracket 44 (FIGURE 4) is mounted on the side of the body 41 that is "upstream" with respect to the direction of rotation of the inner ring, and the bracket is provided with a pair of depending angular legs extending respectively into the recesses 27 and 32 in the ring 22. The leading edge of each leg is feathered and is engaged flush, respectively, with the radially outer wall of the recess or annular gap 27 and the radially inner wall of the recess 32. The inner ends of the legs are spaced apart by a distance equal to the length of the control pins and are located in preselected positions so as to locate the pins in the position thus defined. Preferably, the pins are moved by the two legs to a position wherein they are fully retracted from the recess or annular gap 27, their outer ends are immediately adjacent said gap and their inner ends are spaced radially outwardly from the inner wall of the recess 32. To move the pins, the input station includes at least one and preferably two input means in the form of electromagnetic relays. Specifically, the body 41 at its lower extremity carries an electromagnetic assembly preferably comprised of a pair of electromagnets 45 thereby to define a dual input station. Each electromagnet 45 is provided with an armature 46 extending generally parallel to the radially outer surface of the body 41 and pivotally mounted on a pin 47 secured to the body. The pin 47 in conjunction with its mounting or the electromagnet frame defines a pair of spaced abutments and a spring 48 is confined between the outer abutment and the armature to bias the armature against the inner abutment and thereby move its lower end away from the electromagnet and its upper end toward the body. At its upper end, each armature similarly engages between spaced abutments on the outer end of an actuating shaft 49 which is slidably and rotatably mounted on and extends through the body to overlie the grooved portion of the inner ring. At its inner end, each shaft 49 includes a diagonally extending cross pin or actuator 50 which depends into the groove or recess 32 in the inner ring 22 in the space between the inner wall of the recess and the inner ends of the control elements 30. A combined compression and torsion spring 51 confined between the body 41 and the actuator 50 serves to maintain the actuator in a predetermined axial position and to bias the same in a predetermined direction toward a protective stop 52. The stop 52 overlies its respective shaft 49 and actuator 50 to protect the same from damage and at the same time serves to stop the actuator 50 in a predetermined angular position wherein it depends into the recess 32 to at least the level of the control elements 30 but not fully to the bottom of the recess. The direction of torsional bias is in opposition to the direction of ring rotation to incorporate an anti-jamming safety factor in the input station.

In use, energization of the electromagnetic coil 45 of one of the thus constituted relays will cause the armature 46 to swing counter-clockwise as viewed in FIGURE 5, whereby the shaft 49 will be pulled outwardly and the actuator 50 will engage a control pin 30 and push the same radially outwardly to an "active" position wherein the pin projects into the recess or annular gap 27. Should the actuator 50 be in its outer position during rotation of the inner ring, the next control pin 30 will engage the actuator and swing it harmlessly away against the torsional bias of the spring 51 without causing damage to any component of the device. Then, when the relay is de-energized, the spring 51 will shift the actuator radially inwardly and swing the actuator back to its initial position in the recess 32. As will presently be described, the inner ring 22 is intermittently moved in arcuate increments corresponding to the spacing of the pins. Consequently, by initially installing the input station with the two actuators 50 thereof aligned with a pair of pins, the actuators will be aligned with pins in the intervals between incremental movements and will be disposed to shift a pin into "active" position upon actuation thereof; and if the actuators are wider than the spaces between control pins, at least one pin will be shifted without fail upon each actuation of either relay.

The purpose of two relays in each input station is to facilitate control of the timer by two operators; and the purpose of a plurality of input stations is to facilitate use of a single memory timing device for a plurality of timing functions, as will be described. As to both features, it is to be noted that the actuators 50 of the relays in each station has herein shown are aligned with two pins spaced only to the extent of one pin, and that the total width of the entire input station bridges only seven of the pins 30 thereby to occupy minimum space. For a single input, the station would be even smaller, and irrespective of size each unit is fully adjustable about the circumference of the rings.

The read-out stations or detectors 60 are also fully adjustable about the circumference of the rings and each comprises, as shown in FIGURE 6, a ring engaging body 61, a releasable ring engaging clamp 62, a control element detecting finger 63, and means, such as an electric switch 64, adapted to be actuated by the finger. The body 61 is suitably formed of sheet metal bent into an inverted U-shape and includes a switch housing main portion and a leg extending over the upper surface of the ring 20, the leg being provided with a depending V-shaped projection adapted to be engaged in the mounting or guide track formed on the ring. The clamp 62, also suitably of sheet metal bent into U-shape, is pivotally mounted on the lower extremity of the main portion of the body and includes a portion extending beneath the ring 20 and having an upwardly extending projection engageable in the lower guide track and an integral lever portion adapted to be grasped by the user to release the clamp from the ring. A torsion spring 65 engaged with the clamp normally biases the track engaging projection thereof into clamping engagement with the ring. Thus, the body 61 may be releasably secured to the ring 20 at any desired point thereon. As will be obvious to those skilled in the art, the input station means 40 may be provided with similar releasable securing means, or the read-out station means 60 may be provided with releasable securing means such as above described with reference to the input stations 40.

The detector finger 63 of each read-out station 60 is pivotally mounted within the body 61 and includes a first leg extending over the ring 20 and terminating in a thin depending projection entering into the recess or gap 27 to sense the presence of control elements 30 therein. The upstream or leading edge of this projection is preferably beveled to facilitate a camming action between the control elements and the finger. A leaf spring 66 confined between the body 61 and the finger 63 normally biases said projection downwardly into the recess 27. At its other end, the finger may be shaped as necessary to effect substantially any desired control function. In the disclosed embodiments of the invention, the device to be actuated comprises a micro-switch 64 having an actuating button 67 normally biased outwardly of the switch body. To actuate the switch, the finger 63 includes a depending portion disposed to the ring side of the switch and normally biased by the spring 66 to depress or actuate the switch button 67. When a control element 30 raises the sensing projection of the finger, the depending portion of the finger is swung away from the switch to permit outward movement of the button 67 to its normal position, thereby to facilitate performance of a control function. The switch 64 is preferably detachably mounted on the body 61 to permit replacement thereof if necessary, and to accommodate this desideratum without unduly increasing the dimensions of the detector I employ telescoping bolt and nut means 68 with thin external heads as the switch mounting means. By virtue of the described construction, the detectors may be located as close as the third pin from an input station and as close together as every other pin.

The rotatable one of the two rings 20 and 22 may be driven in any of a variety of manners, and I have shown herein what I regard to be the preferred embodiment of drive means, having particular concern for absolute accuracy, full utilization of the capabilities of the timing device, minimum wear and tear on the device, and economy. To facilitate accuracy I prefer to form a gear integrally with the rotatable ring, and do so in the present embodiment of the invention by cutting gear teeth 71 directly into the radially inner surface of the rotatable inner ring 22. The teeth are preferably of a number and arcuate spacing identical to that of the control pins 30, whereby correlation between ring movement and the arcuate spacing of the input and detector stations is facilitated. Also to this end, I prefer to provide on the exposed face of the inner ring 22 a scale exactly correlated to the gear teeth and the control elements.

To drive the ring 22, I provide a pawl assembly including a crank arm 72 having a shaft journalled in a sealed bearing mounted in the base 24 coaxially of the two rings, a driving pawl 73 pivotally mounted on the outer end of the arm for engagement with the gear teeth 71, and a detent pawl 74 pivotally mounted on the base 24 for engagement with the gear 71. The pawl 74 is pressed into engagement with the teeth by a torsion spring 75 whereby the pawl holds the ring 22 against rotation in the counterclockwise direction as the ring is viewed in FIGURES 1 to 3. The drive pawl 73 is of the same configuration as the pawl 74 and is also pressed into engagement with the gear by a spring 76. In use, the crank arm 72 and the pawl 73 are power driven in a counter-clockwise direction to an arcuate extent correlated to a predetermined number of the teeth 71 (preferably a single tooth), during which movement the pawl 74 retains the ring against rotation and the pawl 73 ratchets over the tooth or teeth encountered in its arcuate movement. When the power driven means releases the crank 72, a tension spring 77 connected to the crank and anchored on the base 24 returns the crank and the pawl 73 in a clockwise direction, whereupon the pawl 73 drives the ring through a short arc of movement and the pawl 74 ratchets over the tooth or teeth passing the same. To define a predetermined limit to spring biased movement of the crank, while accommodating pre-tensioning of the spring, a stop 78 is fixed to the base 24 in the path of clockwise movement of the pawl 73.

By virtue of the fact that the crank 72 and drive pawl 73 are spring actuated in the ring driving direction, the rings, control elements and input and detector stations are isolated from the power drive means and are thus protected from damage in the event of jamming of the mechanism.

The power drive means for the crank arm 72 may take a variety of forms, but I prefer to utilize a link or connecting rod 79 pivotally connected to the arm and extending therefrom into a drive housing 80 integral with the base 24. Intermediate its ends, the link or rod 79 is slidably guided for reciprocable movement by a slide bearing 81, and at its outer end carries a cam follower in the form of a roller or ball bearing 82. To drive the rod, I utilize a cam, which in this case comprises a rotary cam 83 detachably mounted on a drive shaft 84 that is journalled in a permanently sealed bearing mounted in the housing 80. The cam 83 has a relatively gradual rise and a relatively sharp or steep drop-off. As the cam is rotated, the spring 77 biases the follower 82 into engagement with the cam and the cam gradually or slowly moves the rod toward the crank 72 to effect counter-clockwise movement of the crank and the pawl 73. When the cam rotates to the extent that the follower engages the drop-off, the spring 77 effects fairly rapid movement of the ring, whereby the ring is moved only during a small fraction of each revolution of the cam 83. Thus, for substantial input rotation, the increment and duration of movement of the ring is small to facilitate correlation in time between a long timing interval and a short arc of ring movement. Also, by simply inverting the rotary cam 83, the entire device is adapted to either right-hand or left-hand drive.

Figure 2:
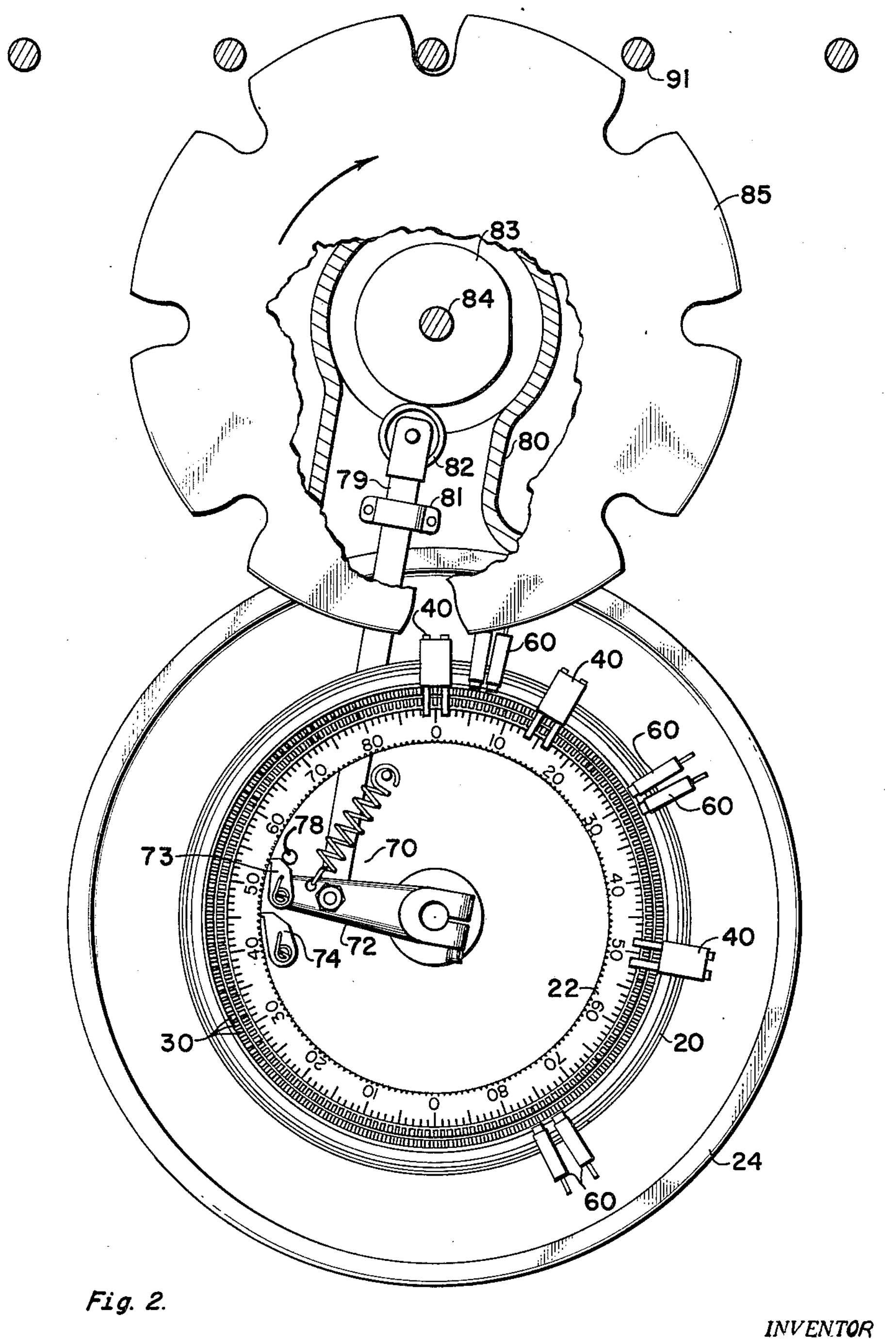
FIGURE 2 is a plan view of the timer and its drive, portions of the driving means being broken away to reveal all of the drive components.
Figure 3:
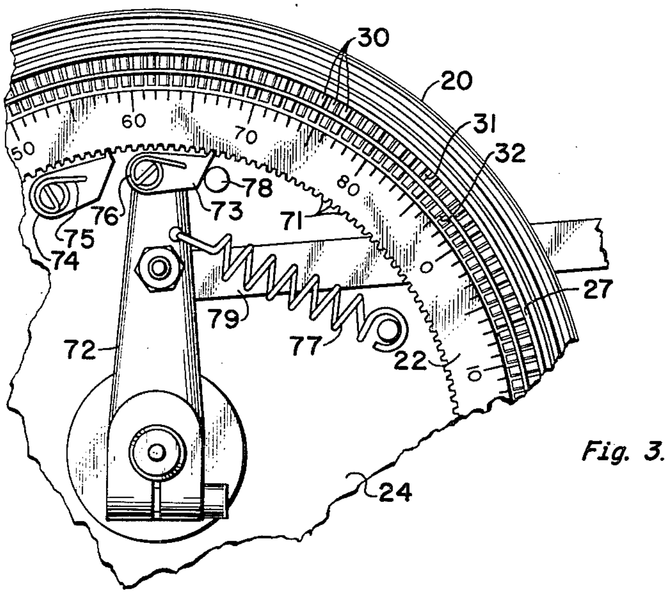
FIGURE 3 is a fragmentary plan view, on an enlarged scale, of a segment of the rings and of the ring driving pawl and ratchet assembly.

By way of exemplification, the device of the invention may be employed in an article sorting system wherein an endless conveyor carrying article supporting trays passes successively adjacent a delivery area and a plurality of remote discharge areas into which articles are to be sorted according to some predetermined characteristic. The delivery station is manned by two operators spaced from one another in the direction of conveyor movement and each provided with a keyboard of selector switches correlated to respective discharge areas. The switches of the keyboard are in turn coupled respectively to the upstream and downstream relays of the several input stations so that each operator may control a respective relay at each station. To drive the inner ring in timed relation to the conveyor, the conveyor, which is indicated generally at 90 in FIGURES 1 and 2, is equipped with equally spaced depending pins 91. The timing device drive shaft 84 carries a wheel 85 having radial slots in its periphery spaced by a distance equal to the spacing of the pins, so that successive engagement of a predetermined number of the pins 91 in the wheel will effect one revolution thereof. By appropriate selection of the diameter of the wheel 85, a single revolution of the wheel may be correlated to such length of conveyor travel as may be desired, all as will be obvious to those skilled in the art. Preferably, each revolution of the wheel 85, and thus of the cam 83, causes a one-tooth increment of movement of the ring 22. Thus, ring movement is accurately timed to conveyor movement and the particular arrangement of the drive means affords a smooth continuous drive force input to the timing device without subjecting the device to impact or shock.

Assuming a ring with 180 control elements and gear teeth, and timing such that movement of the inner ring through 6 increments would correspond to movement of any given conveyor tray from the delivery area to a first discharge area, movement of the ring through 15 increments would correspond to movement of the tray from the delivery area to a second discharge area, movement of the inner ring through 25 increments would correspond to movement of a tray from the delivery area to a third discharge area and so on, it would be appropriate to mount a first input station 40 at said twelve o'clock or zero position on the ring, a second station at about position 15, a third station at about position 50 and so on. To detect positioning of a control element in "active" position by the first input station and to correlate detection to the first discharge area, detection or read-out means 60 are provided at or in the vicinity of position 6 on the ring, i.e., in the vicinity spaced 6 increments from the input station. The functions performed by the detecting means may vary depending upon circumstances, tray spacing, personal preference, etc. For example, a single detection unit 60 may be disposed at station 6 momentarily to actuate a tray tilting mechanism at the first discharge area; or as shown in FIGURE 2, a first detector switch unit may be disposed at say position 5 on the ring to cause a tray tilting mechanism at the first discharge area to be rendered operative, and a second detector switch unit may be disposed at say position 7 on the ring to cause the tilting mechanism at the first discharge area to be rendered inoperative. If desired, a third detector could be disposed at another position to perform another function, for example, at position 6 to energize a warning device or indicator at the moment an article is delivered to the first area by virtue of tilting the tray as it passes such area. In like manner, detector or read-out units 60 may be disposed in the vicinity of 15 increments downstream from the second input station 40, e.g., at positions 29 and 31, and in the vicinity of 25 increments downstream from the third input station, e.g., at positions 74 and 76. Thus, in less than one-half the circumference of the timer, three sets of input and read-out means are provided. Using the whole circumference, five input stations are readily accommodated.

In operation of the sorting system described, the two operators at the delivery or sorting area would each examine articles and mentally classify the same for sorting into the respective discharge areas. Operator 1 might for example classify an article into area 2, whereupon he would place the article on the tray then passing adjacent him and push button 2 on his keyboard. At the same time, operator 2 might classify an article into area 1 whereupon he would place the article on the tray passing him and push button 1. When operator 1 pushed button 2, he energized one of the relays at input station 2 to move a pin, say pin number 15, to active position; and when operator 2 pushed button 1, he energized a relay at input station 1 to move a pin say pin number 177, to active position. Pin 177 would be the one moved due to the offset of the actuators 59 of the two relays in each station and the advance movement of the ring by virtue of movement of the conveyor to bring a tray adjacent the operators. Subsequently when, as the conveyor is advanced, the first of the two trays reaches discharge area 1, the tray tilting mechanism is not actuated since pin 177 has not yet reached the detector at position 5, so that the first tray and the article thereon bypass discharge area 1. A few moments later, pin 177 will contact the detector at position 5 so that the tilting mechanism is actuated to tilt the second of the trays as it passes discharge area 1 thereby to discharge the article on the second tray into that area. Pin 177 then contacts the detector at position 7 to de-activate the tilting mechanism at area 1 and thereafter passes into the pin locating means 44 of the second input station to be relocated in its "inactive" position. Shortly thereafter, pin 15 will energize the detector at position 29 to activate the tray tilting mechanism at the second discharge area and the article on the first of the trays will discharge into the second area, whereafter pin 15 will engage the detector at station 31 and pass into the locating means 44 of the third input station to be returned to "inactive" position.

Thus, it will be appreciated that the operators by keying input signals into the timing mechanism in correspondence with the passage of the trays will read into the device information concerning articles carried by the respective trays, and that the device thereafter at a predetermined time interval will transmit the "memorized" data to cause performance of the intended function at the intended time, i.e., to cause tilting of a respective tray at the preselected discharge or sorting area. Due to the timing of ring movement relative to tray spacing and movement, signals may be read into the device as rapidly as the operators can perform their duties, and all of these signals will be transmitted from the device in exact correlation to the information read into the same. Other uses of my memory device will of course be apparent to those skilled in the art, such as the uses described in the above-identified patent and application of Bruno E. Enssle.

Referring now to FIGURES 7 to 10, I have shown a second embodiment of my invention similar to the first, but departing therefrom in that the control elements comprise balls shiftable axially of the rings, the input stations are of revised structure and permanently located in the stationary ring, and a revised intermittent drive means is employed. In the respects in which this unit is the same as or very similar to the previously described device, I have employed in the drawings the same reference numerals as used above; and in the respects in which this device differs, reference numerals similar to those previously used but in the one hundred series will be employed in the following description.

Figure 7:
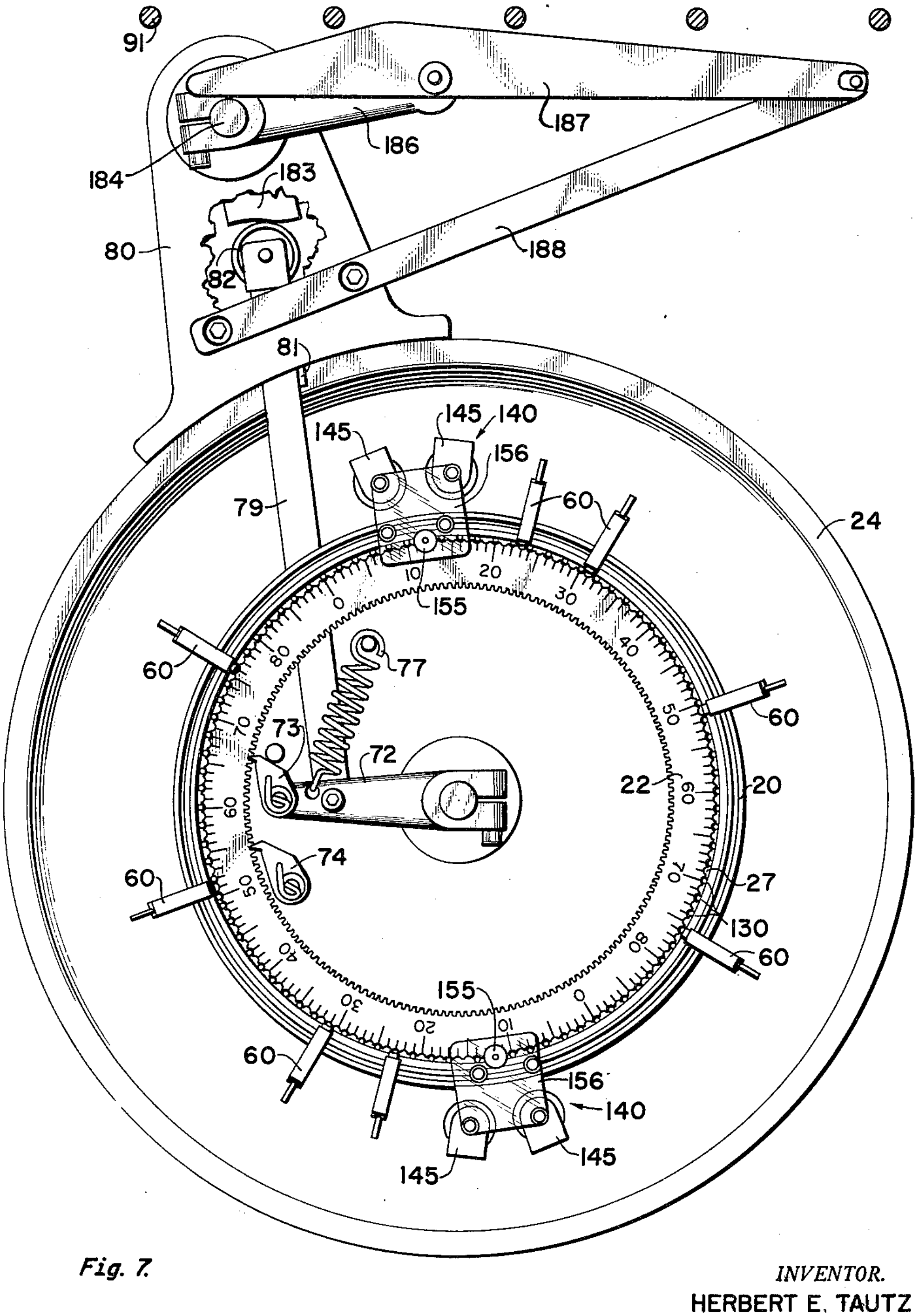
FIGURE 7 is a plan view of a second embodiment of the control device of the invention showing a modified form of drive means.
Figure 8:
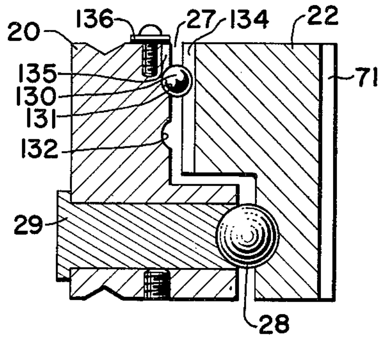
FIGURE 8 is a vertical section, on an enlarged scale, of the relatively rotatable rings and the control elements of the FIGURE 7 embodiment of the invention, the view showing the manner in which the control elements and bearing means are assembled between the rings.

As shown particularly in FIGURES 7 and 8, the device comprises a stationary outer ring 20 and rotatable inner ring 22 defining an annular gap 27 therebetween. The rings are mutually journalled upon one another by a series of balls 28 fitting within aligned annular grooves in radially opposed surfaces of the ring, i.e., surfaces opposed to one another in the direction radially of the rings, the balls being loaded into said grooves through a radial port in the outer ring which is closed by a plug 29 and an associated set screw.

The control elements of this device comprise ferromagnetic balls 130 selectively positionable in a pair of axially spaced parallel annular grooves 131 and 132 of shallow depth defined in the radially inner face of the outer ring 20. The balls are confined between the radially opposed surfaces of the two rings and are adapted to be driven through a selected groove 131 or 132 by radial projections or teeth 134 on the inner ring. Specifically, the portion of the inner ring juxtaposed to the grooved portion of the outer ring comprises a gear defining between each pair of adjacent teeth an axially extending shallow ball receiving pocket traversing the grooves 131 and 132, each pocket being adapted for reception of a single ball 130. Consequently, as the inner ring is rotated, it drives the series of balls 130 around within the ring 20.

To load the balls 130 into the ball receiving pockets and grooves, an axial port or notch 135 is drilled in the outer ring from the upper surface thereof into the adjacent groove 131. A ball may then be inserted into each of the pockets defined by the gear teeth 134 with the balls coming to rest in the groove 131. After the loading of the balls, the port 135 may be closed by a washer 136 or the like anchored to the outer ring by a screw or like fastener.

Figure 9:
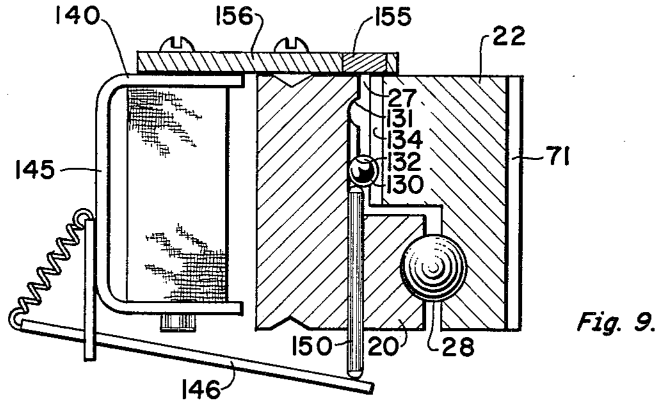
FIGURE 9 is a vertical section of the rings and a first form of input station for the device of FIGURES 7 and 8.

At one or more locations about its periphery, the outer ring 20 is provided with input station means 140, a first embodiment of which is illustrated in FIGURE 9. As shown, the input station requires the cutting away through a short arc of the rib that separates the grooves 131 and 132, thereby to define an area within which the two grooves are in open communication. As the inner ring rotates, each ball brought into this area drops by gravity to the lower extremity thereof, i.e., the balls from the upper groove 131 drop into a position, and the balls from groove 132 remain in a position, in alignment with the lower groove 132. As rotation continues, the balls are brought sequentially into alignment with read-in means comprising one or more electromagnets 145 each including a pivotally movable armature 146 engaged with and adapted to elevate a respective actuator pin 150 which is mounted for vertical reciprocation in the ring 20 and extends upwardly into the said area within the grooves communicate with one another. Each read-in means also includes a permanent magnet 155 extending over the gap 27 adjacent the upper groove 131. Preferably, the entire assembly is of generally U-shape and fits about the outer margin of the ring 20. Specifically, the assembly includes a magnet mounting plate 156 detachably secured to the upper surface of the outer ring and extending radially therebeyond to form a cantilever bracket from which the coil of the electromagnet 145 depends, the armature of the electromagnet extending inwardly beneath the outer ring to engage the pin 150.

In use, energization of the coil of the electromagnet 145 will cause attraction of the armature 146 thereby to drive the pin 150 upwardly, preferably in a rapidly reciprocating manner by use of an electromagnetic assembly of the bell ringer type. As the pin 150 engages the ball 130, it drives the ball upwardly in the respective pocket defined by the gear teeth 134, whereupon the ball is attracted by the permanent magnet 155 and held thereby in alignment with the upper groove 131, whereby the ball will be moved into the upper groove upon rotation of the inner ring to assume an "active" position. Balls not so moved will assume a normal or "inactive" position in the lower groove 132.

Figure 10:
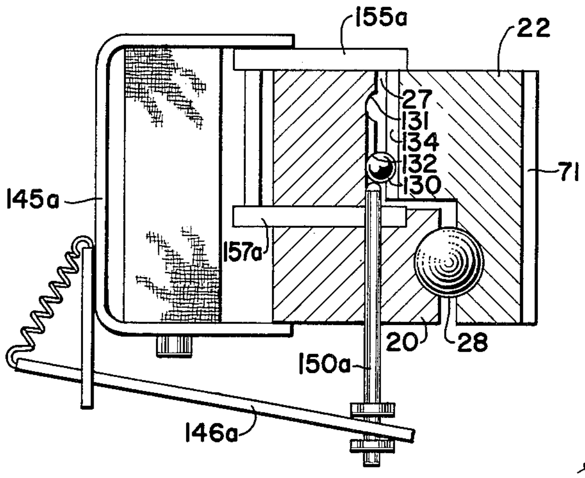
FIGURE 10 is a similar view showing a second form of input station for the device of FIGURES 7 and 8.

A second form of input station means 140 for this embodiment of the invention, particularly adapted for use of the unit in any position whatever, is shown in FIGURE 10. In this structure, the arrangement of the parts, herein indicated by the same reference numerals suffixed by "*a*," is quite the same as that above described, except that the armature **146*a* has a two-way connection with the actuator pin 150*a*, the outer ring 20 is drilled adjacent the groove 132 for reception of one pole piece of a magnetic assembly 155*a*, the other pole piece of which is disposed adjacent the groove 131, and the grooves are supplemented by guide means (not shown) for physically guiding the balls into alignment with groove 132, in which position they are releasably retained by the respective pole of the permanent magnet means 155*a***.

The advantages of this unit are best visualized if the same is considered as being inverted from the position shown or as being set on edge, i.e., with the rings disposed in a vertical plane. Now, as the inner ring rotates, the balls are physically moved by the guide track means associated with the grooves 131 and 132 into alignment with the groove 132, and the balls are retained in this position by the permanent magnet means. If the coil of the electromagnet (again of the bell ringer type) were energized, the armature **146*a* would rapidly reciprocate the actuator 150*a*, whereupon a ball 130, or a number of such balls, would be pushed away from one permanent magnet pole toward the other permanent magnet pole, and the ball would be attracted to the latter and held thereby in alignment with the groove 131 for guidance into "active" position in the groove 131. Balls not so moved of course continue into the groove 132** to "inactive" position.

The detector or read-out means 60 of the device shown in FIGURES 7 to 10 are each preferably identical to the means depicted particularly in FIGURE 6. As will be appreciated from a comparison of FIGURES 6 and 8, the fingers 63 of the detector will enter into the gap 27 and sense the presence or absence of the ball in the groove 131 to effect such control functions as may be desired.

It is also preferred that the inner ring 22 be provided with internal gear teeth 71 and that the same be rotated by a ratchet assembly identical to that previously described. However, in FIGURE 7, I have shown an alternate to the means for deriving input energy in appropriately timed relationship to a conveyor. The alternate means comprises an oscillatory cam 183 fixed to a cam shaft 184 that is journalled in a permanently sealed bearing mounted in the drive housing 80. The cam and shaft are preferably biased to a predetermined (counter-clockwise) position by a torsion spring not shown. The cam 183, which is directly engaged by the rod carried follower 82, has the same functional characteristics as the cam 183, in that it has a fairly gradual rise and due to a spring return, the effect of a sharp drop-off for the purposes previously described.

To oscilllate the cam, a crank arm 186 is secured at one end to the shaft 184 and at its other end is pivotally connected to an intermediate point on an elongated pivotally movable cam arm 187. The cam arm is pivotally mounted adjacent the end thereof that is upstream relative to conveyor movement on a bracket 188 secured to the housing 80. The arm 187 is so shaped that its outer surface defines an inclined cam surface extending into the path of movement of the conveyor carried drive pins 91.

In use of the device, the pins 91 may be located on the conveyor at whatever uniform spacing may be desired to achieve a particular timing between conveyor travel and rotation of the ring 22. As a pin 91 advances toward and engages the arm 187, the arm is swung inwardly thereby rotating the crank arm 186, shaft 184 and cam 183 in a clockwise direction to move the follower 82, link 79 and pawl actuating crank arm 72 inwardly to condition the pawl 73 and spring 77 for incremental advancement of the ring 22. When the pin 91 clears the rising portion of the crank arm 187, the springs return the enumerated components to initial position to advance the ring 22 one increment and condition the device for the next incremental advancement. Due to the long lever arm and the gradual rise thereof, the input to the timing mechanism is gradual and does ont subject the same to undue impact or shock.

Thus the device of FIGURES 7 to 10 is seen to achieve substantially the same objectives as the unit of FIGURES 1 to 6. The relative shortcoming of the unit resides in the fact that the input stations are not adjustable and must be permanently installed in preselected locations. However, where the unit is prospectively restricted to a single use for its life, this is not disadvantageous. In such case, where the unit is to be installed horizontally, the simplified input station means of FIGURE 9 may be employed. For other positions of the unit, the read-in means of FIGURE 10 is preferred.

Referring now to FIGURES 11 to 15, a further embodiment of a ball timer is shown as comprised in its essentials of the same basic components as the device of FIGURES 7 to 10, i.e., a pair of relatively rotatable rings 20 and 22 defining a sensing gap 27, balls 28 mutually journalling the rings together, ferromagnetic control balls 130 selectively positionable in an active groove 131 or an inactive groove 132 and driven therethrough by gear teeth 134 on the inner ring, and one or more detectors 60 for sensing the presence of balls in the active groove 131. The unit differs from those previously described in the respects particularly of a preferred vertical disposition, a modified single read-in station, and a modified drive.

Figure 11:
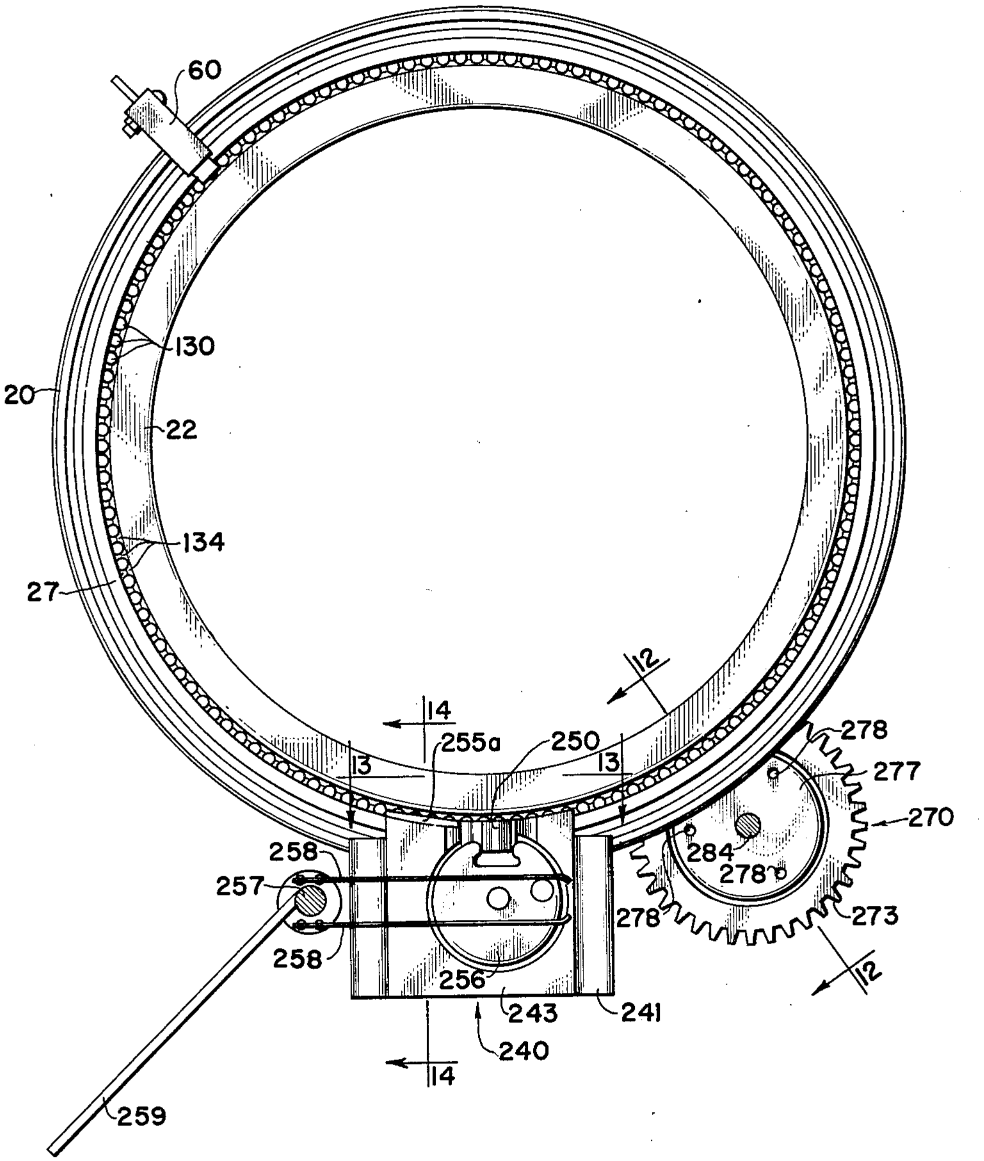
FIGURE 11 is a front elevation of a third embodiment of the timing device of my invention.

As shown in FIGURE 11, the single input station 240 of the unit comprises a combined input means and ring supporting foot for the complete unit. Specifically, the station is comprised of a block 241 secured to the outer ring and forming a supporting foot therefor. In the area of the foot, the portion of the outer ring in which the grooves 131 and 132 are formed is cut away, as indicated at 242 in FIGURE 13, to accommodate entry into the ring of the input means, or the selector or trigger as it is sometimes called. Actually, both the outer ring and the foot are recessed for this purpose, and a secondary block 243 is mounted in the recess by suitable fasteners.

On its upper surface, the block 243 includes, at its upstream end, a channel 244 communicating with both of the grooves 131 and 132 and diminishing in width to the size of a ball so as to direct balls from both grooves to a predetermined location, preferably to an "inactive" position aligned with the groove 132. At the downstream end of the ball locating channel 244, I provide an oscillatable actuator 250 comprising a small plug journalled in the upper surface of the block 243 and having a channel therethrough, the actuator being oscillatable to align the discharge end thereof selectively with the grooves 131 and 132. At its upstream or inlet end, the channel in the actuator 250 is flared so that the same will communicate with the outlet of the channel means 244 in both of its said positions.

Figure 14:
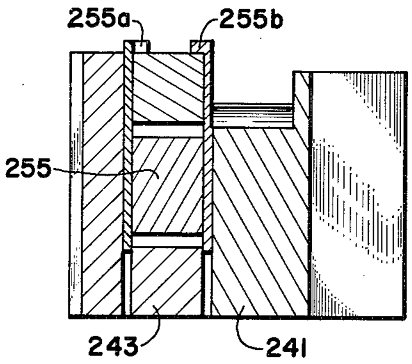
FIGURE 14 is a vertical sectional view of the control element guide means of the FIGURE 11 embodiment of the invention, the view being taken substantially on line 14—14 of FIGURE 11.

To the outlet side of the actuator 250, I provide a tortuous magnetic guide path for the balls 130 to insure foolproof guidance of the balls into one or the other of the grooves 131 and 132 without jamming. Referring to FIGURE 14, I form in the block 243 at its downstream end a generally U-shaped recess within which I locate a magnetic assembly comprised of a permanent magnet 255 and a pair of pole pieces **255*a* and 255*b*. Each pole piece abuts one end of the magnet and extends upwardly therefrom to the upper surface of the block 243 and includes a leg resting on said surface. The legs of the pole pieces have complementary zig-zag confronting faces thereby to define a zig-zag or undulatory path of a width slightly greater than twice the diameter of the balls. Each pole piece thus includes portions extending adjacent the center line of the space between the two grooves 131 and 132, whereby each ball passing through the guide cannot become centered on such line but is attracted one way or the other by the pole pieces. Each pole piece is aligned at its opposite ends with the outer edge of a respective one of the grooves 131 and 132 and extends from the actuator 250 to immediately adjacent the respective groove at the downstream end of the trigger area 242**, whereby normally to receive a pre-directed ball and guide it into the preselected groove.

To effect controlled movement of the actuator 250, the block 243 carries on the exposed side thereof a rotary plug 256 having a slot in its periphery within which a crank arm integral with the actuator is received. This plug is also provided with an axially projecting stud spaced from said slot. An input shaft 257 disposed in spaced parallel relation to the axis of the plug 256 carries a pair of spaced parallel transversely extending spring arms 258 which are disposed to opposite sides of the stud on the plug. Thus, oscillation of the shaft 257, as by means of articles intermittently deflecting a feeler arm 259 thereon, will cause oscillation of the plug 256 and oscillatory movement of the actuator 250 to effect controlled selective triggering of the balls 130 into the grooves 131 and 132.

For detecting the presence of balls 130 in the outer groove 131, detector means 60 identical to that previously described are preferably employed.

Figures 12, 13:
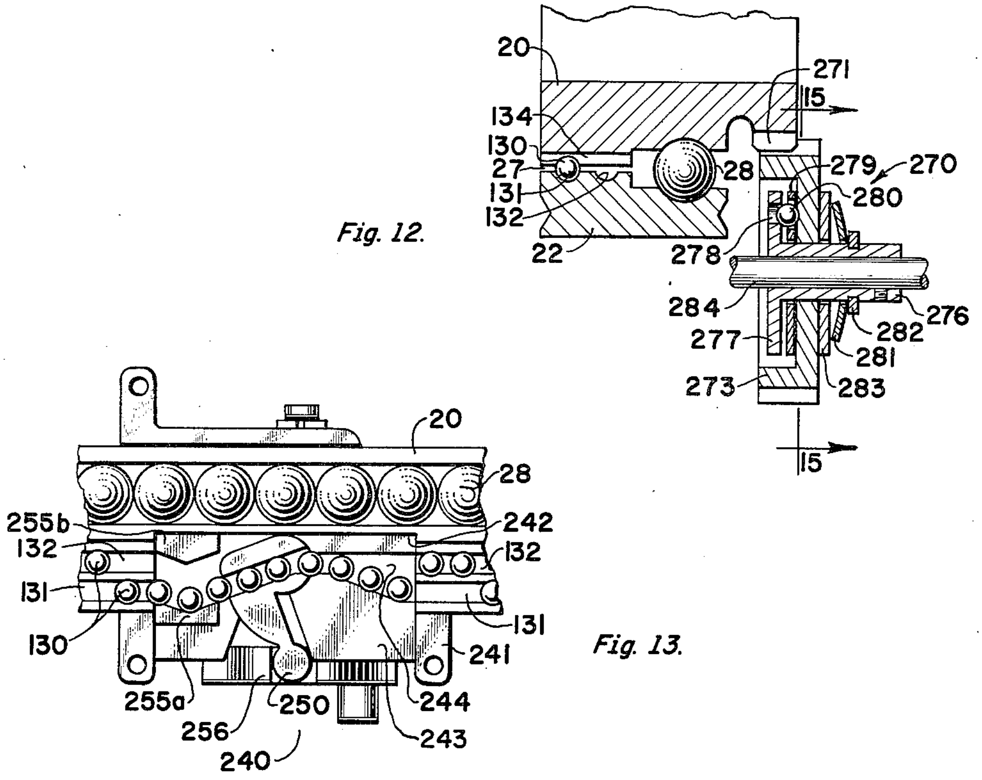
FIGURE 12 is a fragmentary cross-sectional view of the device of FIGURE 11 showing the relatively rotatable rings and the drive means therefor, the view being taken substantially on line 12—12 of FIGURE 11.
FIGURE 13 is a sectional view taken on line 13—13 of FIGURE 11 and showing in plan the input station of the FIGURE 11 embodiment of the invention.
Figure 15:
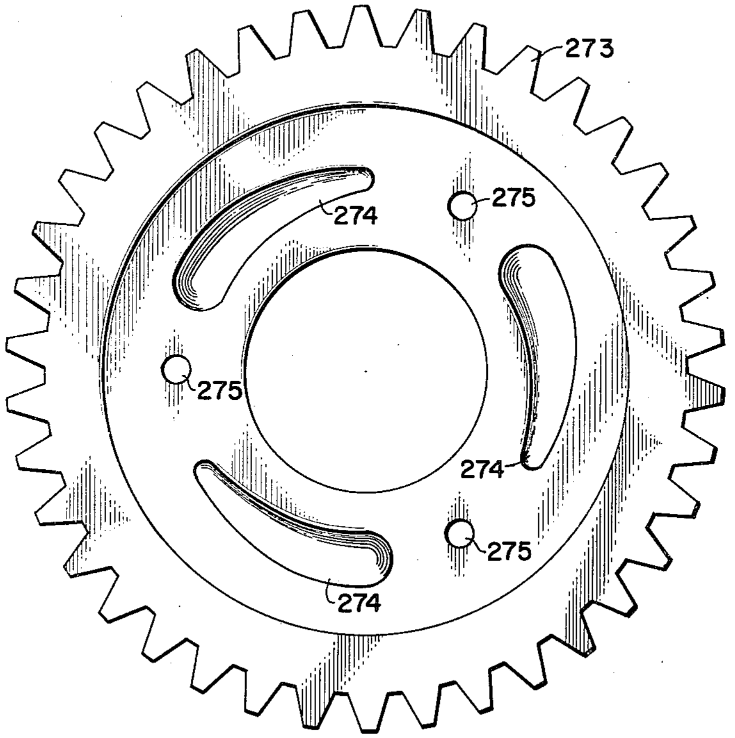
FIGURE 15 is a front elevational view of the drive pinion shown in FIGURE 12, the view being taken substantially on line 15—15 of FIGURE 12 and illustrating part of the yieldable drive means for the timer.

With reference particularly to FIGURES 11, 12 and 15, I have shown a modified form of drive for the memory timing device of my invention. This is shown as an external rotary gear drive 270 for the inner ring 22, but as the description proceeds it will be apparent that the drive gear could as well be meshed with internal gear teeth, like the teeth 71. To accommodate external drive, the inner ring 22 is extended axially beyond the outer ring 20, and the extended portion is provided with teeth forming a ring gear 271. A drive pinion 273 of relatively small diameter carried upon a shaft 284 is meshed with the gear 271. The shaft 284 may suitably be journalled in the housing for the timer and be rotated by virtue of direct, gear or chain reduced, or a ratchet drive connection with a conveyor or the like.

A feature of the present invention is the provision of yieldable and/or releasable means in the drive assembly for the ring 22 to prevent damage to the timing mechanism in the event it should become jammed. To this end, I embody a novel disengaging clutch in the pinion 273 for releasably coupling the same to the shaft 284. Specifically, I make the pinion 273 of cup-shape and form in the bottom of the cup a plurality of circumferentially spaced arcuate cam recesses 274 each of progressively increasing depth and width in the direction of shaft and pinion rotation, as shown in FIGURE 15. In the spaces between the recesses, I provide an equal number of partially spherical indentations 275 at the same spacings. The pinion as thus formed is journalled on a hub 276 which is fixed to the shaft 284 and which at one end is provided with a circular radial flange 277 juxtaposed to the recessed face of the pinion and fitting freely within the cup-shape of the pinion. This flange in turn is provided with a plurality of circumferentially spaced holes 278 of slightly larger size than, but of the same spacing and location as, the indentations 275 in the pinion. Between the juxtaposed faces of the pinion and flange, I journal an annular retainer 279 having relatively large holes therein of the same spacing and location as the holes 278 and indentations 275. A single ball 280 is positioned in each hole in the retainer for entry into the holes in the hub flange and the indentations in the pinion flange. The pinion 273 and the hub flange 277 are normally biased toward one another by a spring cup washer 281 confined between the opposite side of the pinion and a C-washer 282 on the hub. Preferably, a wear-resistant washer 283 is disposed between the gear and the spring, and the spring engages this washer at equally spaced points corresponding to the number and angular spacing of the balls 280.

In use, the balls 280 carried by the retainer 279 normally seat in aligned pairs of the holes 278 in the hub flange 277 and the indentations 275 in the pinion 273, and are retained in such position by the spring 281, whereby the hub and pinion are connected for conjoint rotation. Should the timing mechanism become jammed, the pinion 273 will encounter resistance to rotation, whereupon the balls 280 will tend to be forced out (as by cam action) of the indentations 275 and/or the holes 278. Since the indentations 275 are shallower and smaller than the holes 278, the balls 280 will be cammed out of the indentations when the resistance to pinion rotation exceeds the force component of the spring 281. The hub flange 277 will then drive the balls over the face of the pinion flange until the balls enter the grooves 274 whereupon they will commence to recede from the hub flange as they progress deeper into the grooves 274. The grooves 274 are of an ultimate depth to permit the balls 280 to separate from the flange 277 but not the retainer 279. Thus, as soon as the balls reach the deep ends of the grooves, the hub 276 will rotate harmlessly or freely within the pinion without imparting any driving force thereto.

When the malfunction that resulted in stopping of the gear 271 and pinion 273 has been corrected, the disengaging clutch assembly 273–283 may be re-engaged simply by rotating the gear and pinion in normal driving direction while maintaining the shaft 284 stationary, or by rotating the shaft 284 in the direction opposite normal rotation while maintaining the gear and pinion stationary. As this relative reverse rotation occurs, the spring 281 causes the flange 277 frictionally to engage the retainer 279 and/or the balls 280 whereupon the retainer is either held or driven by the flange 277 to cause the balls 280 to move relatively toward the shallow ends of the grooves 274. The flange 277 then engages the balls and drives them fully to the shallow end of the grooves where the balls are held until the holes 278 become aligned with the balls, whereupon the spring 281 causes the balls to engage in the holes with an audible snap action. The flange 277 thereafter positively drives the balls out of the grooves and over the face of the pinion flange until the balls become aligned with the indentations 275, whereupon the spring again causes the balls to engage with an audible snap action. Thus, the operator is informed by two sharp, audible "clicks" that the clutch is re-engaged, and that the apparatus may again be set into normal operation.

As will be obvious to those skilled in the art, this same pinion and disengaging clutch drive assembly may be employed in an internal drive, as by meshing the pinion 273 with an internal tooth gear like that indicated at 71 in FIGURES 1 to 10, if so desired. In like manner, the ratchet drive mechanisms 70 and 170 of FIGURES 1 to 10 may be employed in conjunction with an external gear, such as the gear 271 should that be desired. In either case, the drive means is yieldable and/or releasable to prevent damage to the timing mechanism in the event of malfunctioning of the mechanism.

In all three of the embodiments described herein, the memory timer of the present invention is comprised essentially of a pair of rings of thin radial section mutually journalled on one another by a series of bearing balls, whereby relative deviation of the rings is minute, and any tendency of either ring to flex or warp is resisted and/or duplicated by the other ring, the rings always run true to one another, and these advantages are attained substantially irrespective of ring diameter. In all embodiments, ring drive, whether internal or external and whether by gear or ratchet, incorporates a yieldable connection responsive to predetermined resistance to ring rotation to render the drive means inoperative when necessary to protect the timer. Also in all embodiments, the read-out means 60 is freely adjustable to any desired position on the timer. In FIGURE 1 the read-in means 70 is freely adjustable, and both reading means are freely variable in number and location to facilitate performance of a wide variety of functions. In similar manner, the devices depicted in FIGURES 7 through 15 facilitate a wide variety of assemblies and functions. In all units, jamming is mitigated and improved means are provided for triggering the control elements to their active and inactive positions. Accordingly, all of the objects and advantages of the invention have been shown herein to be attained in a convenient, economical and practical manner.

While I have shown and described what I regard to be the preferred embodiments of my invention, it will be appreciated that various changes, rearrangements and modifications may be made therein without departing from the scope of the invention, as defined by the appended claims.

I claim:

1. In control devices and the like having a pair of relatively movable members, control elements carried by one of the members and element actuating and detecting means carried by the other of the members; said members comprising a pair of relatively rotatable concentric rings having bearing surfaces opposed to one another in the direction radially of said rings, and bearing means engaging said opposed surfaces and physically joining said rings.

2. In control devices and the like having a pair of relatively movable members, control elements carried by one of the members and element actuating and detecting means carried by the other of the members; said members comprising a stationary outer ring, and a rotatable inner ring concentric with the outer ring and journalled thereon.

3. In control devices and the like having a pair of relatively movable members, control elements carried by one of the members and element actuating and detecting means carried by the other of the members; said members comprising a pair of relatively rotatable concentric substantially coplanar rings each of thin radial section, the inner ring having an outer diameter slightly smaller than the inner diameter of the outer ring, said rings having bearing surfaces opposed to one another in the direction radially of said rings and each including an annular groove, and an annular series of ball bearings engaging in said grooves and physically joining said rings for relative rotation.

4. In control devices and the like, a pair of relatively rotatable concentric substantially coplanar rings each of thin radial section, the inner ring having an outer diameter slightly smaller than the inner diameter of the outer ring and defining an axially open annular gap between said rings, annular bearing means spaced from said gap physically joining said rings for relative rotation, control elements carried by one of said rings adjacent said gap and being exposed in said gap, and a detector adjustably mounted on the other of said rings for adjustment about substantially the entire periphery thereof, said detector including a detector finger extending into said gap for actuation by the control elements.

5. In control devices and the like having a pair of relatively movable members, control elements carried by one of the members and element actuating and detecting means carried by the other of the members; said members comprising a pair of relatively rotatable concentric rings having bearing surfaces opposed to one another in the direction radially of said rings and each including an annular groove, an annular series of ball bearings engaging in said grooves and physically joining said rings for relative rotation, and spring controlled drive means engaging an exposed radial surface of one of said rings for relatively rotating said rings, said drive means being responsive to predetermined resistance to rotation to discontinue relative rotation of said rings.

6. In control devices and the like having a pair of relatively movable members, control elements carried by one of the members and element actuating and detecting means carried by the other of the members; said members comprising a pair of relatively rotatable concentric rings, annular bearing means physically joining said rings for relative rotation, one of said rings having teeth on an exposed surface thereof, a drive gear meshed with said teeth, a drive shaft on which said gear is journalled, and a yieldable disengaging clutch between said gear and said shaft, said clutch comprising a plurality of circumferentially spaced arcuate recesses in one face of said gear, each recess being of progressively increasing depth in the direction of gear rotation and including a detent hole at its trailing end, a ring secured to said shaft in opposed relation to said face of said gear having detent holes corresponding to those in said face, a spring urging said ring toward said face, a thin friction member between said ring and said face having holes therein corresponding to said detent holes, and a ball of a diameter slightly greater than the maximum depth of said recesses positioned in each hole in said friction member.

7. In control devices and the like having a pair of relatively movable members, control elements carried by one of the members and element actuating and detecting means carried by the other of the members; said members comprising a pair of relatively rotatable concentric rings having bearing surfaces opposed to one another in the direction radially of said rings, annular bearing means engaging said opposed surfaces and physically joining said rings for relative rotation, a support for one of said rings, the other of said rings having teeth on an exposed surface thereof, a first pawl pivoted on said support and engaging said teeth for retaining said other ring against rotation in one direction, a second pawl engaging said teeth, an operating lever for said second pawl, movably mounted on said support interiorly of said rings, a spring between said lever and said support normally biasing said second pawl and said lever in the other direction, a link coupled to said lever, and a cam for actuating said link, said cam defining a slow rise for moving said lever and second pawl in said one direction and a relatively fast drop off for releasing said lever for spring actuation, said spring being responsive to a predetermined resistance to rotation of said other ring to discontinue rotation thereof.

8. In control devices as set forth in claim 7, said cam comprising a continuously rotated cam.

9. In control devices and the like as set forth in claim 7, said cam comprising an intermittently oscillated cam.

10. In control devices and the like having a pair of relatively movable members, control elements carried by one of the members and element actuating and detecting means carried by the other of the members; said members comprising a stationary outer ring and a rotatable inner ring concentric with the outer ring and journalled thereon, said inner ring having teeth in its radially inner surface, a support for said outer ring, a first pawl pivoted on said support and engaging said teeth for preventing movement of said inner ring in one direction, a lever pivoted on said support at the axis of said rings and extending toward said inner ring, a second pawl pivoted on said lever and engaging said teeth, means for moving said lever and said second pawl in said one direction, and spring means between said lever and said support for moving said lever and said second pawl in the other direction.

11. A control device comprising a pair of relatively rotatable substantially coplanar concentric rings defining an axially open annular gap therebetween, an annular series of control elements carried by one ring, a plurality of input stations carried by the other ring and each having means for shifting said control elements selectively toward and away from said annular gap, and a plurality of detectors carried by said other ring at preselected circumferential spacings from respective ones of said stations, each detector including a finger extending into said gap for detecting the presence of a control element therein.

12. In control devices and the like, a pair of relatively rotatable concentric rings having surfaces opposed to one another in the direction radially of said rings, a pair of axially spaced parallel grooves in said surface of one ring, gear teeth in said surface of the other ring bridging the grooves in the one ring, and a control element comprising a ball in each space between the teeth on said other ring riding in a selected groove in the one ring.

13. In control devices and the like, a pair of concentric rings having surfaces opposed to one another in the direction radially of said rings, one of said rings being stationary and the other being journalled on the one and retained thereon against other than relative rotation, a pair of axially spaced parallel grooves in said surface of said one ring, gear teeth in said surface of said other ring traversing the grooves in the one ring, and a control element comprising a ball in each space between the teeth on said other ring riding in a selected groove in the one ring.

14. In control devices and the like, a pair of relatively rotatable substantially coplanar concentric rings having surfaces opposed to one another in the direction radially of said rings, opposed concentric grooves in said opposed surfaces of said rings, an annular series of balls riding in said grooves, journalling said rings for relative rotation and retaining said rings against other than relative rotation, a pair of axially spaced parallel grooves in said surface of one ring, gear teeth in said surface of the other ring bridging said pair of parallel grooves in the one ring, and a control element comprising a ball in each space between the teeth on said other ring riding in a selected one of said parallel grooves in the one ring.

15. In control devices and the like, a pair of relatively rotatable substantially coplanar concentric rings having surfaces opposed to one another in the direction radially of said rings, opposed partially circular concentric grooves in said opposed surfaces of said rings, an annular series of balls in the space between said grooves for journalling said rings for relative rotation and for retaining said rings against other than relative rotation, a hole in one ring of a diameter larger than that of said balls extending radially from said grooves through the one ring for accommodating insertion and removal of said balls, a pair of axially spaced parallel grooves in said surface of one ring, gear teeth in said surface of the other ring traversing said pair of parallel grooves in the one ring and extending axially to one face of said other ring, a control element comprising a ball in each space between the teeth on said other ring and riding in a selected one of said parallel grooves in the one ring, a notch in said surface of said one ring extending from the face of the one ring corresponding to said one face of the other ring into the adjacent one of said parallel grooves for accommodating insertion and removal of each control element, and plug means closing said hole and said notch.

16. A control device comprising a pair of relatively rotatable concentric rings having surfaces opposed to one another in the direction radially of said rings, one ring being journalled on the other and being retained thereby against other than relative rotation, means for rotating said one ring relative to the other, a pair of axially spaced grooves in said surface of said other ring, gear teeth on said surface of said one ring traversing said grooves, a ball in each space between the teeth on said one ring riding in a selected groove in said other ring, an input station including a portion communicating with both of said grooves and a selectively movable member in said portion for directing said balls in a direction parallel to the axis of said rings selectively into said grooves, and a detector spaced circumferentially from said input station for detecting the presence of balls in one of said grooves.

17. A control device comprising a pair of relatively rotatable substantially coplanar concentric rings of thin radial section having surfaces opposed to one another in the direction radially of said rings, an annular series of balls adjacent one end face of said rings journalling one ring on the other and retaining the two rings against other than relative rotation, a pair of axially spaced grooves in said surface of one ring, one of said grooves being positioned adjacent the other end face of said rings and the other of said grooves being positioned immediately inwardly of the one groove, gear teeth on said surface of the other ring traversing said grooves, means for rotating said other ring relative to the one ring, a ball in each space between the teeth on said other ring riding in a selected groove in the one ring, an input station on said one ring including a portion communicating with both of said grooves and a selectively actuable member in said portion movable generally axially of said one ring for directing said balls in an axial direction selectively into said grooves, and a detector adjustably mounted on the one ring for selected circumferential spacing from said input station and including a detector finger extending into said one groove for detecting the presence of balls in said one groove upon rotation of said other ring.

18. A control device as set forth in claim 16 wherein said rings are disposed horizontally, said input station comprises a portion of the grooved ring at which the grooves are in open communication with one another and the balls when entering said portion drop by virtue of gravity into alignment with the lower groove, said actuable member comprises a vertically reciprocable rod for selectively moving balls upwardly into alignment with the upper groove, and a magnet is provided adjacent the upper groove for retaining balls moved upwardly by said rod in alignment with the upper groove.

19. A control device as set forth in claim 16, wherein said input station comprises a portion of the grooved ring in which the grooves are in open communication with one another, a magnet is provided in said portion adjacent one groove for normally retaining balls in alignment with said one groove, guide means is provided in said portion in alignment with the other groove for directing balls from the other groove into alignment with said one groove, and said actuable member comprises reciprocable rod for selectively deflecting balls away from said one groove and the magnet toward said other groove.

20. A control device as set forth in claim 16, wherein said input station comprises a portion of the grooved ring at which the grooves are in open communication with one another, a magnetic pole is provided adjacent each groove for retaining balls in alignment with the respective groove, a guide means is provided in said portion in alignment with one groove for directing balls from the one groove into alignment with the other groove, and said actuable member comprises an element movable generally axially of said rings for selectively deflecting balls away from said other groove and its magnetic pole toward said one groove and its magnetic pole.

21. A control device as set forth in claim 16, wherein said input station comprises a block fitted into the grooved ring in alignment with the grooves and including a guide portion communicating with both grooves and guiding balls from both grooves into a single groove, and said actuable member comprises a swingable grooved section aligned at one end with said single groove and selectively alignable at its other end with each of the grooves in the ring.

22. A control device as set forth in claim 16, wherein said input station comprises a block fitted into the grooved ring in alignment with the grooves and including a guide portion communicating with both grooves and guiding balls from both grooves into a single groove, said actuable member comprises a swingable groove section aligned at one end with said single groove and selectively alignable at its other end with each ofthe grooves in the ring, and a pair of magnetic pole pieces having opposed complementary zig-zag surfaces are disposed between respective ones of the grooves in the ring and said other end of said swingable groove section for magnetically guiding balls from said section into said grooves.

23. In a control device wherein ferromagnetic balls are magnetically guided from a triggering zone selectively into a plurality of grooves for movement therethrough, the improvement comprising magnetic guide means having a pair of complementary zig-zag pole pieces mounted in spaced juxtaposed relation to one another and respectively extending from the triggering zone to respective ones of the grooves.

24. In a control device wherein control elements are moved relative to a reference member and are directed selectively to varying positions relative to the reference member for performance of control functions, the improvement comprising a reference member having opposed guide tracks thereon paralleling the path of control element movement, and a detector having opposed surfaces complementary to and clampingly engaged with said guide tracks, one of said surfaces comprising a movable lever accommodating selective clamping and release of said detector relative to said guide tracks at any point along said guide tracks, said detector including a detecting finger which, when said detector is clamped to said tracks, intersects the path of control element movement in one of said varying positions of the control elements.

25. In a control device comprised of a stationary member, a movable member, a plurality of control elements carried by the movable member, means for directing the elements to varying positions relative to the members and means on the stationary member for detecting the presence of elements in one of said varying positions for performance of control function; said members comprising a pair of concentric rings the stationary one of which is provided on the opposed faces thereof with concentric guide tracks, and reading station means adjustably mounted on said tracks and comprising a body bridging the radial face of the ring and having a surface complementary to and engaging one of said tracks, and a lever pivoted on said body and having a surface complementary to and engaging the other of said tracks, said lever being selectively engageable with and releasable from said other track to accommodate detachable mounting of said reading means at any point along said tracks.

26. In a control device having a gear drive, the improvement comprising a disengaging clutch between the drive gear and its driving shaft, said clutch comprising a radial face on the gear journalled on the shaft and having a plurality of circumferentially spaced arcuate recesses therein each of progressively increasing depth in the direction of gear rotation, and a detent hole trailing each said groove, a ring secured to said shaft in opposed relation to the radial face of the gear and having detent holes corresponding to those in said face, a spring urging said ring toward said face, a thin friction member between said ring and said face having holes therein corresponding to said detent holes, and a ball of a diameter slightly greater than the maximum depth of said recesses positioned in each hole in said friction member.

27. In a control device having a pair of relatively rotatable members, control elements between the members and triggering means for directing the control elements to selected positions, the improvement wherein said members comprise radially outer and inner members the outer one of which is stationary, a mounting foot for said members comprising a block secured to and depending from an outwardly exposed surface of said outer member, a trigger mount in said block, and an aperture in said outer ring establishing communication between said trigger mount and the control elements, the trigger means being carried by said trigger mount and extending through said aperture for cooperation with the control elements.

28. A control device comprising a pair of relatively rotatable substantially coplanar concentric rings defining an axially open annular gap therebetween, an annular series of control pins slidably mounted on one ring, said pins extending and being slidable in a direction generally radially of said rings for movement toward and away from said annular gap, an input station carried by the other ring for shifting said pins selectively toward and away from said gap, and a detector carried by said other ring and angularly spaced from said input station for sensing the presence of a pin in said gap.

29. A control device comprising a pair of members movable relative to one another in a given path, one of said members including track means paralleling said path, a detector adjustably engaged with said track means for selective positioning therealong, a series of control pins extending transversely of the path of movement of said members and slidably mounted on the other of said members for movement toward and away from said detector, and an input station adjustably engaged with said track means for selective positioning therealong, said station comprising means for shifting said pins selectively toward and away from said detector.

30. A control device comprising a pair of relatively rotatable coaxial members, one of said members at an axially exposed face thereof having a pair of concentric annular ribs defining in fixed respect to said one member three annular recesses concentric with one another and said members, said ribs having a plurality of circumferentially spaced pairs of holes therethrough with each pair aligned in the direction radially of said members, a friction pad in the central one of said recesses, a pin slidably mounted in each pair of aligned holes and engaging said friction pad, said pins being of a dimension in the direction radially of said members greater than that of said central recess but less than the total dimension radially of said members of the three recesses, an input station on the other of said members including means entering into the inner and outer ones of said recesses for locating each of said pins in a first predetermined position and means entering into one of said inner and outer recesses for moving said pins selectively to a second predetermined position, and a detector on said other member angularly spaced from said input station and including a portion entering one of said inner and outer recesses for sensing the positions of said pins.

31. A control device comprising a pair of relatively rotatable substantially coplanar concentric rings each of thin radial section, the radially outer surface of the inner ring being juxtaposed to the radially inner surface of the outer ring but defining a narrow annular gap therebetween, an axially exposed face of one of said rings having a pair of annular ribs concentric with one another and said rings defining a pair of annular grooves adjacent said annular gap, said annular groves being concentric with one another and said rings and defining with said gap three concentric annular recesses, said ribs having a plurality of circumferentially spaced pairs of holes therethrough with each pair aligned in the direction radially of said rings, a friction pad in the central one of said recesses, a pin slidably mounted in each pair of aligned holes and engaging said friction pad, said pins being of a dimension in the direction radially of said rings greater than that of said central recess but less than the total dimension radially of said rings of the three recesses, the other of said rings including circular track means concentric with said recesses, an input station adjustably engaged with said track means and including means entering into the inner and outer ones of said recesses for locating each of said pins in a first predetermined position and means entering into one of said inner and outer recesses for moving said pins selectively to a second predetermined position, and a detector adjustably engaged with said track means in angularly spaced relation to said input station and including a portion entering into one of said inner and outer recesses for sensing the positions of said pins.

References Cited by the Examiner

UNITED STATES PATENTS

| | | | |
|---|---|---|---|
| 602,906 | 4/98 | King | 308—178 |
| 1,181,669 | 5/16 | Kelley | 74—125 |
| 1,853,714 | 4/32 | Allen | 74—568 |
| 1,863,414 | 6/32 | Pratt | 74—568 |
| 2,020,877 | 11/35 | Coolidge | 74—568 |
| 2,208,831 | 7/40 | Bassett | 74—125 |
| 2,743,001 | 4/56 | Nordquist | 221—10 |
| 2,909,626 | 10/59 | Enssle | 74—568 |
| 2,969,133 | 6/61 | Langcheck | 192—56 |
| 3,013,445 | 12/61 | Enssle | 74—568 |
| 3,033,369 | 5/62 | Kragle | 209—230 |

BROUGHTON G. DURHAM, *Primary Examiner.*